I. A. WEAVER.
TOWING DEVICE.
APPLICATION FILED MAR. 3, 1917.

1,308,537.

Patented July 1, 1919.
2 SHEETS—SHEET 1.

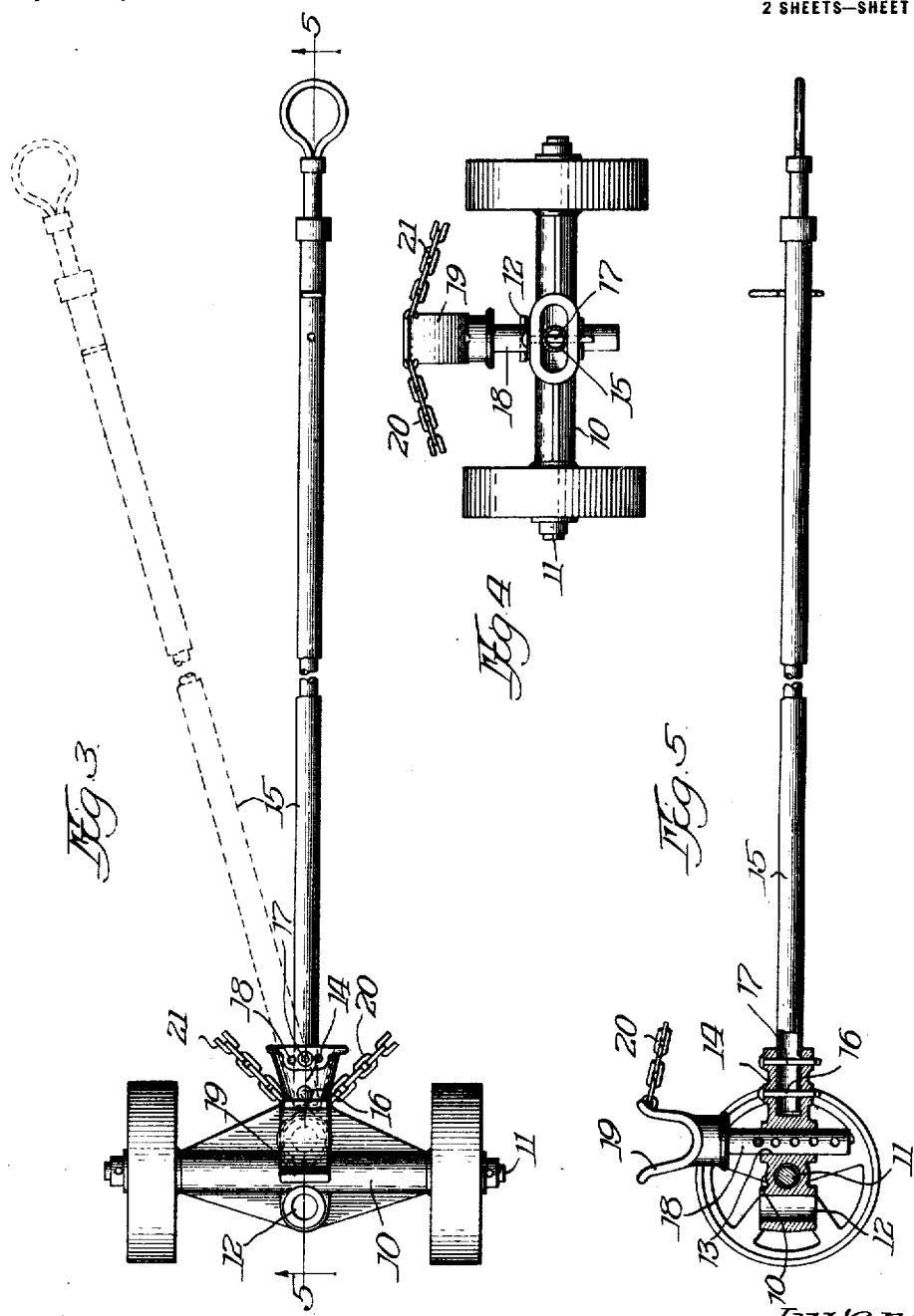

UNITED STATES PATENT OFFICE.

IRA A. WEAVER, OF SPRINGFIELD, ILLINOIS, ASSIGNOR TO WEAVER MANUFACTURING COMPANY, OF SPRINGFIELD, ILLINOIS, A CORPORATION OF ILLINOIS.

TOWING DEVICE.

1,308,537.     Specification of Letters Patent.     Patented July 1, 1919.

Application filed March 3, 1917. Serial No. 152,227.

*To all whom it may concern:*

Be it known that I, IRA A. WEAVER, a citizen of the United States, and residing at Springfield, in the county of Sangamon and State of Illinois, have invented certain new and useful Improvements in Towing Devices, of which the following is a description.

My invention relates to devices for use in towing disabled vehicles such as automobiles and has particular reference to an improvement on the device described and claimed in my Patent No. 1,125,227 of Jan. 19th, 1915.

An object in the present improvement is to provide means enabling the ready attachment of the towing device to the vehicle without the use of bolts or similar fastening devices. It frequently happens that owing to the location of the disabled vehicle access thereto is difficult and the supporting and towing device cannot be attached thereto without considerable labor and loss of time. To this end I have provided a pair of simple, flexible connecting devices, such as chains each of which may be secured at one end to the support for the vehicle axle and at the other end to parts of the vehicle such as the springs. Inasmuch as the vehicle axle is intended to be accommodated within a yoke or saddle at the upper end of the standard carried by the towing device, the chains will prevent lateral movement of the axle relative to the yoke, there being no tendency for the axle to be displaced vertically.

In the event that one of the rear wheels of an automobile is broken and it becomes necessary to utilize my towing device for supporting the vehicle at the point of the broken wheel, it is desirable that the wheels of the towing device should be positioned in a line parallel to the rear axle. This is not possible in the construction shown in my prior patent unless the tongue or pole be projected forwardly in line with the longitudinal axis of the car. This causes the pole to lie closely adjacent to a front wheel and to interfere with the steering apparatus and the turning of the wheel. If the tongue is brought near the center of the car at the front axle, the wheels of the towing device and the rear wheel of the automobile will not have a tendency to run in parallel lines and one or the other thereof will be compelled to slip.

An object in the present construction is to provide means permitting angular adjustment of the pole with relation to the towing truck in order that the truck may be positioned in its proper relation to the rear axle when the tongue projects from beneath the car at a point near the center thereof, this even though the truck is placed near one end of the rear axle. The desired result is accomplished by pivoting the pole to the truck and providing means for securing the pole in any of a plurality of angularly adjusted positions.

The invention will be more readily understood by reference to the accompanying drawings, wherein, Figure 1 is a perspective view showing the front end of a disabled automobile to which my towing truck has been applied, the novel fastening means for securing the truck against lateral movement on the front axle being illustrated;

Fig. 3 is a plan view of the truck showing in dotted lines an adjusted position of the pole;

Fig. 4 is a front elevation of the truck, and

Fig. 5 is a sectional view on the line 5—5 of Fig. 3.

Figure 1:
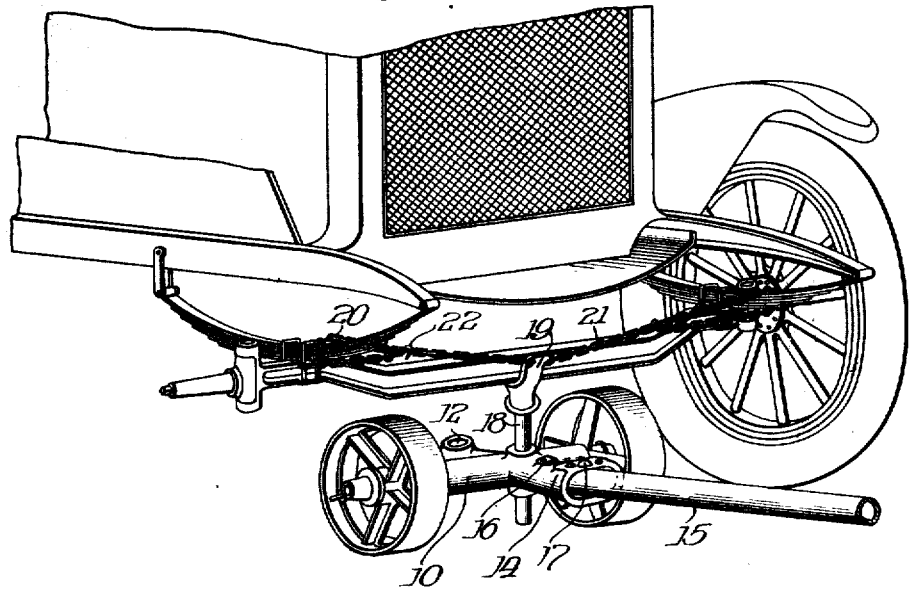
Figure 2:
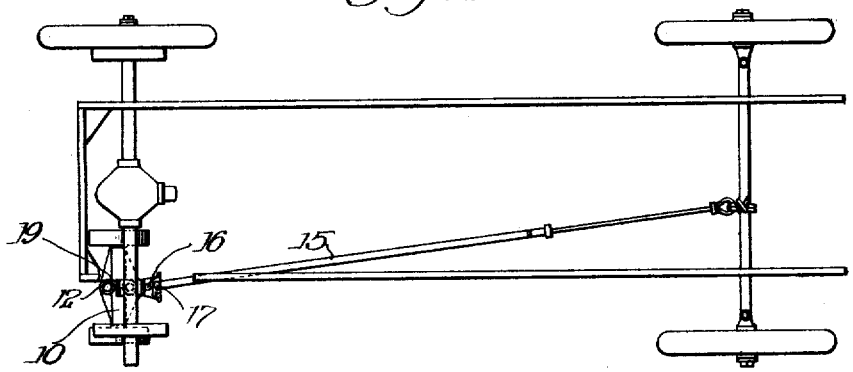
Fig. 2 is a plan view showing the application of the towing device to the rear axle of an automobile, the pole projecting forwardly at an angle to the truck.

Referring more particularly to the drawings it will be seen that the truck comprises a frame 10, which acts as a bearing for a transverse axle 11, the frame being provided with sockets 12, 13, at the front and rear of the axle. A flaring socket 14, is formed as a part of the frame 10, a pole 15, being secured in the socket by means of a vertical pivot 16. Because of the flared socket the pole is adapted for angular movement on its pivot and may be secured in any of a plurality of angularly adjusted positions by means of the pin 17, which engages apertures 18, in the socket. Mounted in one of the vertical openings 12, 13, of the truck is the vertically adjustable swiveled standard 18, having a saddle 19, at the upper end thereof. The axle of the vehicle is adapted to be accommodated within this saddle and to be securely held by gravity against vertical displacement. As a means for preventing the saddle from sliding longitudinally of the axle I prefer to provide oppositely extending flexible members such as chains 20, 21, each of which is secured to the saddle at one end and at the other end is provided with fastening devices such as hooks 22. These chains may be wrapped around and suitably attached by means of the hooks to the springs or other suitable portions of the vehicle. When the parts are in place as shown in Fig. 1, the truck is securely held against movement in all directions.

By employing the described means for angularly adjusting the tongue with relation to the truck, the towing device may be suitably positioned in association with the rear axle and the towing function performed by the pole projecting from the front of the car at the middle of the frame.

Obviously the exact form and arrangement of the parts is immaterial and such modifications as are within the scope of the appended claim are considered to be within the spirit of my invention.

I claim:

In a supporting and towing device for disabled vehicles, the combination of a truck having means for engaging a vehicle axle and provided with a flaring socket, a pole mounted on a vertical pivot in said socket, and means for securing said pole in one of a plurality of positions in said socket, substantially as described.

Signed at Springfield, Illinois, this 23rd day of February, 1917.

IRA A. WEAVER.

Witnesses:
F. M. ROGERSON,
P. W. LAWLESS.

Copies of this patent may be obtained for five cents each, by addressing the "Commissioner of Patents, Washington, D. C."